United States Patent
Prasad

(10) Patent No.: US 9,208,054 B2
(45) Date of Patent: Dec. 8, 2015

(54) WEB SERVICE FOR AUTOMATED CROSS-BROWSER COMPATIBILITY CHECKING OF WEB APPLICATIONS

(75) Inventor: Mukul R. Prasad, San Jose, CA (US)

(73) Assignee: Fujitsu Limited, Kawasaki-shi (JP)

( * ) Notice: Subject to any disclaimer, the term of this patent is extended or adjusted under 35 U.S.C. 154(b) by 1007 days.

(21) Appl. No.: 13/026,899

(22) Filed: Feb. 14, 2011

(65) Prior Publication Data
US 2012/0210236 A1 Aug. 16, 2012

(51) Int. Cl.
G06F 15/16 (2006.01)
G06F 9/44 (2006.01)
G06F 11/36 (2006.01)

(52) U.S. Cl.
CPC ........ *G06F 11/3604* (2013.01); *G06F 11/3664* (2013.01); *G06F 11/3684* (2013.01); *G06F 11/3688* (2013.01)

(58) Field of Classification Search
CPC ............ G06F 11/3664; G06F 11/3688; G06F 11/3684; G06F 9/44589
USPC .................................................. 717/125, 126
See application file for complete search history.

(56) References Cited

U.S. PATENT DOCUMENTS

| | | | |
|---|---|---|---|
| 6,182,085 B1 | 1/2001 | Eichstaedt et al. ............ | 707/104 |
| 6,263,364 B1 | 7/2001 | Najork et al. ................. | 709/217 |
| 7,139,747 B1 | 11/2006 | Najork .................................. | 1/1 |
| 7,496,581 B2 | 2/2009 | Nomiyama et al. .......... | 707/100 |
| 7,590,620 B1 | 9/2009 | Pike et al. ......................... | 707/3 |
| 7,634,496 B1 | 12/2009 | Evans ............................ | 707/102 |
| 7,636,717 B1 | 12/2009 | Gupta et al. ....................... | 707/6 |
| 7,761,395 B2 | 7/2010 | Wookey ........................... | 706/45 |
| 7,860,849 B1 | 12/2010 | Venkatachary et al. ....... | 707/705 |
| 8,392,890 B2 * | 3/2013 | Miller ............................ | 717/127 |
| 2004/0103394 A1 | 5/2004 | Manda et al. ................ | 717/126 |
| 2004/0162874 A1* | 8/2004 | Woo et al. ..................... | 709/203 |
| 2006/0206547 A1 | 9/2006 | Kulkarni et al. .............. | 707/205 |
| 2006/0230011 A1 | 10/2006 | Tuttle et al. ..................... | 706/62 |

(Continued)

FOREIGN PATENT DOCUMENTS

| | | | | |
|---|---|---|---|---|
| CN | 100353733 | 12/2007 | ............. | G06F 17/30 |
| CN | 101344881 | 1/2009 | ............. | G06F 17/30 |

(Continued)

OTHER PUBLICATIONS

United States Office Action, U.S. Appl. No. 12/7237,568; pp. 19, Mar. 16, 2012.

(Continued)

*Primary Examiner* — Hieu Hoang
(74) *Attorney, Agent, or Firm* — Baker Botts L.L.P.

(57) ABSTRACT

One embodiment presents a user interface to a first user, the user interface being configured to enable the first user to provide user input that: specifies a first web application, and a behavior exploration specification, a plurality of web browsers, and a set of comparison rules for the first web application; requests a plurality of models to be constructed with respect to the web browsers for the first web application based on the behavior exploration specification; requests the models of the first web application to be compared with each other based on the set of comparison rules; and requests one or more results of the comparison performed on the models of the first web application to be presented; and in response to each user input received from the first user, performs one or more operations for the first user.

52 Claims, 8 Drawing Sheets

(56) References Cited

U.S. PATENT DOCUMENTS

| | | | |
|---|---|---|---|
| 2007/0022480 A1 | 1/2007 | Mewman | 726/24 |
| 2007/0061877 A1 | 3/2007 | Sima et al. | 762/12 |
| 2007/0083808 A1 | 4/2007 | Setlur et al. | 715/513 |
| 2007/0100967 A1 | 5/2007 | Smith et al. | 709/219 |
| 2007/0168832 A1 | 7/2007 | Richardson et al. | 714/758 |
| 2007/0240225 A1* | 10/2007 | Shrader et al. | 726/25 |
| 2008/0072100 A1* | 3/2008 | Okada | 714/28 |
| 2008/0098375 A1 | 4/2008 | Isard | 717/149 |
| 2009/0007074 A1 | 1/2009 | Campion et al. | 717/124 |
| 2009/0055801 A1* | 2/2009 | Kodaka et al. | 717/124 |
| 2009/0225082 A1 | 9/2009 | Hargrove et al. | 345/440 |
| 2010/0088668 A1 | 4/2010 | Yoshihama et al. | 717/105 |
| 2010/0095208 A1 | 4/2010 | White et al. | 715/704 |
| 2010/0175049 A1 | 7/2010 | Ramsey et al. | 717/115 |
| 2011/0066609 A1 | 3/2011 | Ashkenazi et al. | 707/709 |
| 2011/0078556 A1 | 3/2011 | Prasad et al. | 715/234 |
| 2011/0078663 A1* | 3/2011 | Huang et al. | 717/126 |
| 2011/0099491 A1 | 4/2011 | Abraham et al. | 715/764 |
| 2011/0191676 A1* | 8/2011 | Guttman et al. | 715/716 |
| 2011/0225289 A1 | 9/2011 | Prasad et al. | 709/224 |
| 2011/0270853 A1 | 11/2011 | Curbera et al. | 707/755 |
| 2012/0030736 A1 | 2/2012 | Resch et al. | 726/5 |
| 2012/0109927 A1 | 5/2012 | Prasad | 707/709 |
| 2012/0109928 A1 | 5/2012 | Prasad | 707/709 |
| 2012/0109929 A1 | 5/2012 | Prasad | 707/709 |
| 2012/0109930 A1 | 5/2012 | Prasad | 707/709 |
| 2012/0109931 A1 | 5/2012 | Prasad | 707/709 |
| 2012/0110063 A1 | 5/2012 | Prasad | 707/203 |
| 2013/0066848 A1 | 3/2013 | Tuttle et al. | 707/711 |

FOREIGN PATENT DOCUMENTS

| | | | |
|---|---|---|---|
| CN | 101443751 | 5/2009 | G06F 15/76 |
| EP | 0 415 497 | 8/1990 | G06F 9/46 |
| JP | 2007-172377 | 7/2007 | |
| WO | WO 2005/077118 | 8/2005 | |

OTHER PUBLICATIONS

United States Finall Office Action, U.S. Appl. No. 12/7237,568; pp. 23, Jul. 6, 2012.
United States Office Action, U.S. Appl. No. 12/957,374; pp. 14, Mar. 29, 2012.
United States Office Action, U.S. Appl. No. 12/957,376; pp. 14, Mar. 5, 2012.
United States Office Action, U.S. Appl. No. 12/957,377; pp. 39, Mar. 14, 2012.
United States Final Office Action, U.S. Appl. No. 12/957,377; pp. 38, Aug. 13, 2012.
United States Office Action, U.S. Appl. No. 12/957,379; pp. 28, Sep. 13, 2012.
United States Office Action, U.S. Appl. No. 12/957,384; pp. 26, May 18, 2012.
United States Patent Application; U.S. Appl. No. 13/441,402; pp. 37, Apr. 6, 2012.
Mesbah et al.; "Invariant-Based Automatic Testing of AJAX User Interfaces"; SERG; pp. 1-11, 2009.
Roest et al.; Regression Testing AJAX Applications: Coping with Dynamism; SERG; pp. 1-10, 2009.
Halle et al.; "Eliminating Navigation Errors inWeb Applications via Model Checking and Runtime Enforcement of Navigation State Machines"; ACM; pp. 235-244, 2010.
Chau et al.; "Parallel Crawling for Online Social Networks"; ACM; pp. 1283-1284, 2007.
Hafri et al.; "Dominos: A New Web Crawler's Design"; IWAW04; pp. 8, 2004.
Mesbah et al.; "Crawling AJAX by Inferring User Interface State Changes"; Software Engineering Research Group; pp. 16, 2008.
Cho et al.; "Parallel Crawlers"; ACM; pp. 13, 2002.
Mesbah, Ali et al., "Automated Cross-Browser Compatibility Testing" International Conference on Software Engineering (ICSE 2011), 2011.
Choudhary, Shauvik Roy, et al., "WebDiff: Automated Identification of Cross-browser Issues in Web Applications", International Conference on Software Maintenance (ICSM 2010), 2010.
Extended European Search Report; Application No. 11185558.1; pp. 7, Sep. 28, 2012.
Extended European Search Report; Application No. 11186160.5; pp. 7, Sep. 28, 2012.
Wolf; "High Performance Embedded Computing. Architectures, applications, and methodologies"; Referex, XP040425711; pp. 520, 2007.
Extended European Search Report; Application No. 11186926.9; pp. 8, Oct. 4, 2012.
Extended European Search Report; Application No. 11186989.7; pp. 8, Oct. 17, 2012.
Extended European Search Report; Application No. 11186993.9; pp. 7, Sep. 28, 2012.
Extended European Search Report; Application No. 12151883.1; pp. 6, Oct. 8, 2012.
U.S. Appl. No. 12/723,568, filed Mar. 12, 2010, Prasad.
United States Final Office Action, U.S. Appl. No. 12/957,379; pp. 36, Feb. 14, 2013.
Oracle; "Oracle Ultra Search User's Guide 10g"; pp. 272, 2003.
Ye et al.; "Crawling Online Social Graphs"; pp. 7, 2000.
United States Final Office Action, U.S. Appl. No. 12/957,384; pp. 33, Jan. 15, 2013.
United States Office Action, U.S. Appl. No. 12/957,381; pp. 21, Mar. 5, 2013.
United States Office Action, U.S. Appl. No. 12/957,374; pp. 12, Jun. 13, 2013.
United States Office Action, U.S. Appl. No. 12/957,376; pp. 19, Aug. 6, 2013.
Mahapatra; "Scalable Global and Local Hashing Strategies for Duplicate Pruning in Parallel A* Graph Search"; IEEE Transactions on Parallel and Distributed Systems; vol. 8, No. 7; pp. 738-756, 1997.
United States Office Action, U.S. Appl. No. 12/957,379; pp. 30, Sep. 26, 2013.
Sun et al.; "Load Balancing Strategies to Solve Flowshop Scheduling on Parallel Computing"; National Natual Science Foundation of China; (973-Program); pp. 5, 2008.
United States Final Office Action, U.S. Appl. No. 12/957,381; pp. 9, Sep. 24, 2013.
Chinese Office Action and English translation; Application No. 201080039223.9; pp. 18, Jan. 17, 2014.
European Office Action issued in EP Appl. No. 12151883.1, 5 pages, Oct. 29, 2014.
Chinese Office Action and English translation; Application No. 201080039223.9; pp. 23, Nov. 25, 2014.
Japanese Office Action and English Translation; Application No. 2011-237621; 6 pages, Feb. 10, 2015.
Muraoka et al., "Attempt to Collect and Analyze Web Pages on the Order of Ten Billion Pages", Information Processing, Information Processing Society of Japan (IPSJ), Nov. 15, 2008, vol. 49, No. 11, p. 1277-1283, Nov. 15, 2008.
Sadakane et al., "Constructing Large Suffix Arrays of Web Texts and Genome Strings", IPSJ SIG Notes, Information Processing Society of Japan (IPSJ), Jul. 1998, vol. 98, No. 58, p. 295-301, 1998.
Japanese Office Action and English Translation; Application No. 2011-237619; 5 pages, Feb. 10, 2015.
Takasago ct al., "A Synchronization Method for Web-subgraphs of Web Servers", DEWS20006, pp. 1-8, [online], IEICE Data Engineering Committee, Jun. 3, 2006.
Japanese Office Action and English Translation; Application No. 2011-237618; 6 pages, Feb. 10, 2015.
Japanese Office Action and English Translation; Application No. 2011-237620; 9 pages, Apr. 7, 2015.
Duda ct al., "AJAX Crawl: Making AJAX Applications Searchable", IEEE International Conference on Data Engineering, pp. 78-89, 2009.
Muraoka et al., "Attempt to Collect and Analyze Web Pages on the Order of Ten Billion Pages", Information Processing, Information Processing Society of Japan (IPSJ), Nov. 15, 2008, vol. 49, No. 11, p. 1277-1283. (w/ translation of portions JP Office Action), Nov. 15, 2008.

(56) References Cited

OTHER PUBLICATIONS

Japanese Office Action and English Translation; Application No. 2011-237623; 3 pages w/ English translation, Mar. 31, 2015.
EPO Germany Communication pursuant to Article 94(3) EPC; Appl. No. 12 151 883.1-1954; Ref. P118475EP00/DNL; Aug. 10, 2015.
EPO Germany Communication pursuant to Article 94(3) EPC; Appl. No. 11 186 993.9-1958; Ref.P117998EPOO/OXT; Aug. 18, 2015).
EPO Germany Communication pursuant to Article 94(3) EPC; Appl. No. 11 186 926.9-1958; Ref. P117997EP00/JNW; Aug. 18, 2015.
EPO Germany Communication pursuant to Article 94(3) EPC; Appl. No. 11 186 160.5-1958; Ref. P117995EP00/CLF; Aug. 18, 2015.
EPO Germany Communication pursuant to Article 94(3) EPC; Appl. No. 11 185 558.1-1958; Ref P117999EP00/UH; Aug. 18, 2015.
EPO Germany Communication pursuant to Article 94(3) EPC; Appl. No. 11 186 805.5-1958; Ref. P117996EP00/JXH; Aug. 18, 2015.

* cited by examiner

WEB SERVICE FOR AUTOMATED CROSS-BROWSER COMPATIBILITY CHECKING OF WEB APPLICATIONS

TECHNICAL FIELD

The present disclosure generally relates to determining differences in an event-driven application accessed in different client-tier environments and more specifically relates to a web-based service for checking compatibility of web applications accessed from different types of web browsers.

BACKGROUND

Event-driven applications typically may be accessed in different client-tier environments. However, in many cases, a first client-tier environment may provide a different end-user experience of the event-driven application than a second client-tier environment. For example, when a web application is accessed through different types of web browsers, the users of the web application may have different experiences with different types of web browsers.

DESCRIPTION OF EXAMPLE EMBODIMENTS

Figure 1:
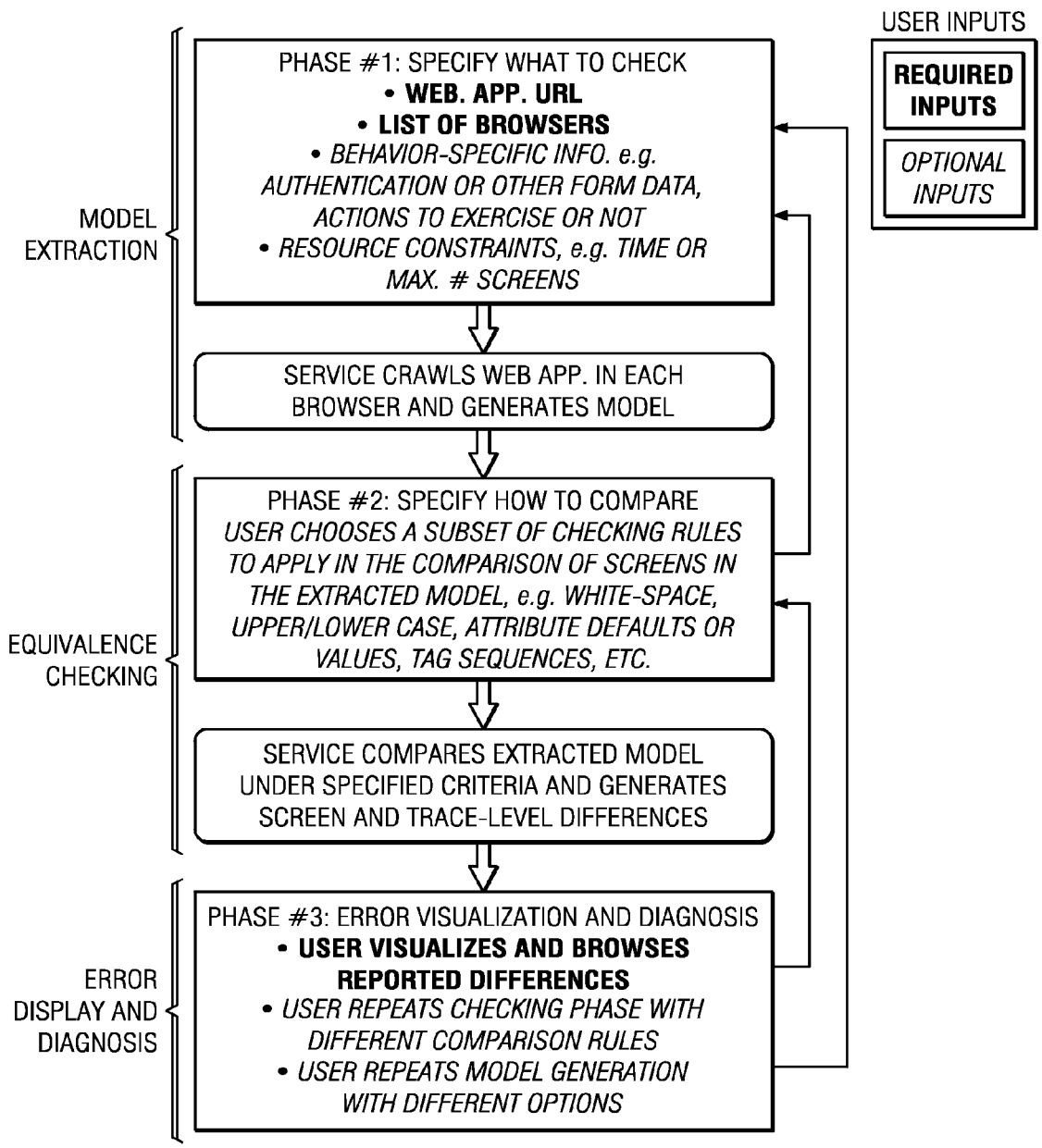
FIG. 1 illustrates the three phases of an example service for checking cross-browser compatibility of web applications.

A web application generally references to an application that is accessed over a computer network, such as the Internet or an intranet. Typically, a web application resides and executes on a server, and each user may access the web application through a web browser residing and executing on a client. The user interface of the web application is presented to each user as, for example, a number of web pages loaded in the web browser. A user may provide inputs to the web application through specific web pages. Similarly, outputs of the web application may be presented to the user through specific web pages. Currently, there exist many different types of web browsers, such as Microsoft Internet Explorer, Mozilla Firefox, or Google Chrome. Different users of a web application may choose to access the web application through different types of web browsers, or a specific user of the web application may choose to access the web application through different types of web browsers at different times. It is thus desirable that a web application has the same look and feel, layout, format, and behavior regardless of through which type of web browser a user accesses the web application. A user may access a web application through Microsoft Internet Explorer, Mozilla Firefox, Google Chrome, or any other types of web browsers, and the user should have essentially the same experience with all of these web browsers.

To ensure that a web application functions consistently across different types of web browsers, particular embodiments provide a service for automatically checking compatibilities and consistencies of web applications accessed through different types of web browsers—a cross-browser compatibility checking service for web applications. In particular embodiments, the service is a web-based service. In other words, the web-based service is itself a web application residing and executing on a server. Each user of the service may access and use the service through a web browser residing and executing on a client associated with the user.

In particular embodiments, a cross-browser compatibility checking service may support any number of users. Multiple users may access and use the service concurrently or at different times. In particular embodiments, each user may access and use the service to perform cross-browser compatibility checking for any number of web applications. In particular embodiments, for each user, the data and operations performed in connection with a specific instance of a cross-browser check initiated by the user are organized into a single session. In other words, for each user, there is a session corresponding to each instance of a cross-browser compatibility check that the user initiates. Such an instance would be specific to the particular user initiating it, the particular client the user initiates it from, and the specific time it is initiated at. Thus, the data and operations performed in connection with cross-browser checking are organized on a per-user per-session basis.

In particular embodiments, as the cross-browser compatibility checking service is a web-based service that resides and executes on a server, all data, including application data and user data, are stored on the server side (e.g., in a data storage accessible to the web-based cross-browser compatibility checking service). In particular embodiments, the user data are stored on the server side on a per-user per-session basis for each user of the service.

In particular embodiments, the cross-browser compatibility checking service includes three phases: model extraction, equivalence checking, and error display and diagnosis. FIG. 1 illustrates the three phases of an example cross-browser compatibility checking service for web applications. In particular embodiments, each session for checking a web application for cross-browser compatibility includes these three phases. That is, to completely perform cross-browser compatibility checking for a specific web application, the service goes through these three phases at least once for the web application. In particular embodiments, during each phase, the service may receive some inputs from a user, perform some operations, or present some outputs to the user.

In particular embodiments, during the model-extraction phase, a user may specify a web application to be tested and checked for cross-browser compatibility and identify a list of web browsers to be checked. In particular embodiments, the web application to be tested may be specified using its corresponding URL (Uniform Resource Locator). Thus, the user does not need to upload the source code of the web application to be tested to the cross-browser compatibility checking service. Instead, as long as the web application has been deployed or is executable, the cross-browser compatibility checking service may access the web application using its URL. In particular embodiments, the cross-browser compatibility checking service may present the user with a default list of currently existing web browsers, and the user may select from the default list the list of web browsers to be checked. Alternatively, in particular embodiments, the user may identify a list of web browsers to be checked and provide the list to the cross-browser compatibility checking service. In particular embodiments, the user may optionally specify additional information, if available, that may be used for constructing models of the web application. For example, the user may specify a behavior exploration specification pertaining to the web application, which may contain guidelines on how the web application's behavior should be explored and hence implicitly guidelines on the specific subset of the behavior of the web application that the models should represent. As another example, the user may specify resource constraints to be applied to the web application or its behavior.

In particular embodiments, for each web browser identified by the user, the cross-browser compatibility checking service may construct a model of the web application with respect to that web browser. The model may represent the behavior of the web application as it is accessed through that specific web browser. In particular embodiments, for each web browser identified by the user, the service may automatically and dynamically execute the web application and extract a model of the observed behavior for the web browser. If the user has provided behavior exploration specification of the web application or resource constrains applied to the web application, the models are constructed based on the user-provided behavior exploration specification or resource constrains.

Given a web application and a list of web browsers, in particular embodiments, to construct a model of the web application with respect to each web browser, the cross-browser compatibility checking service automatically and dynamically executes the given web application under each browser environment and captures and stores the observed behavior as a finite-state machine navigation model for that browser. The crawling is done in a substantially identical fashion for each browser to simulate exactly the same set of potential user-interaction sequences with the web application under each browser environment. In particular embodiments, for each specific web browser, the navigation model produced by crawling the web application is a finite-state machine. The states represent the screens observed by the end-user, on the web browser, and the transitions represent user-actions (e.g., a button click) that cause the web application to transition from one screen to another. Each transition is labeled with the user action that caused it. Each state (screen) is represented by its underlying programmatic representation as viewed by the web browser as well as a screen-shot (i.e., an image) of the screen as rendered in the particular browser.

Figure 4:
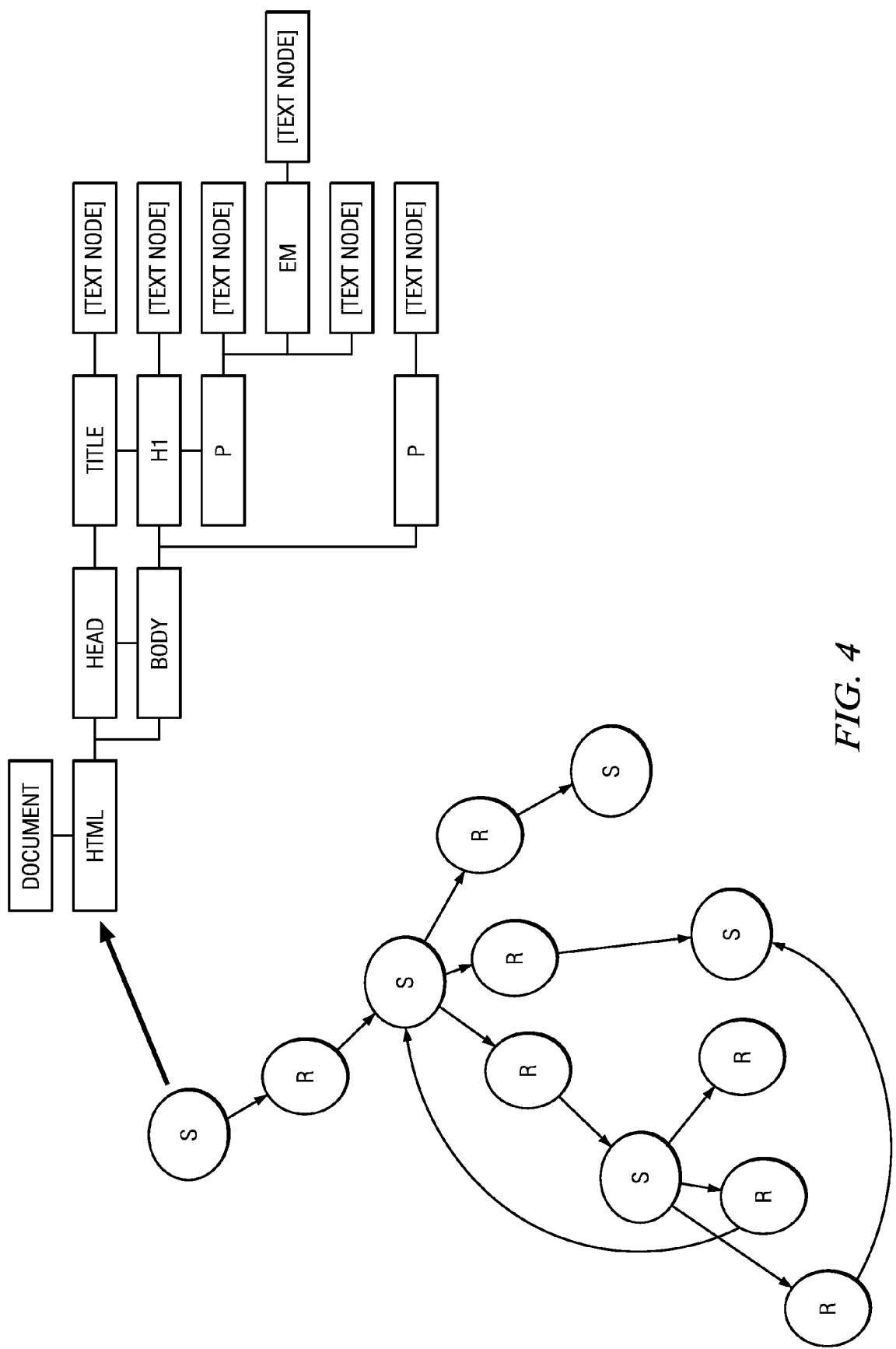
FIG. 4 illustrates an example model of an example web application.

In particular embodiments, for the purpose of meaningfully and efficiently comparing multiple navigation models (e.g., models constructed with respect to multiple web browsers), it may be useful to view and analyze each navigation model hierarchically. The top level is a graph representation of the finite-state machine with the states (screens) represented as unnamed vertices. This graph may be referred to as the state graph. At the second level is the full programmatic representation of each state (screen), which may be referred to as the screen model of the state. Conceptually, the state graph captures the set of traces—alternating sequences of user-actions and screen transitions—without referring to the details of each screen, whereas the screen model of each screen captures precisely this detail, but without any knowledge of transitions leading up to or out of the screen. In particular embodiments, a screen model is essentially an abstract version of the DOM tree of a given screen, displayed on a web browser. The model may be generalized to include and compare other aspects of the client-side state such as JavaScript variable values or CSS (Cascading Style Sheets) properties or a screen-shot image of the screen as rendered in the specific browser. FIG. 4 illustrates an example model of a web application, which includes a state graph and a screen model.

In particular embodiments, during the equivalence-checking phase, the user may specify a set of comparison rules to be used for comparing the models of the web application, which have been constructed for the individual web browsers during the model-extraction phase. For example, one comparison rule may indicate what to do with white spaces (e.g., whether a difference in white spaces between two models is considered an actual difference between the two corresponding browsers or should be ignored); and another comparison rule may indicate what to do with upper and lower spellings of a word (e.g., whether the upper case of a word is considered the same as or different from the lower case of the same word). In particular embodiments, a default set of comparison rules may be presented to the user, from which the user may select the set of comparison rules. If the user does not select a set of comparison rules, the default set of comparison rules may be used. One or more of the comparison rules may be configurable based on user input and user data. For example, a particular comparison rule may provide for ignoring differences with respect specific HTML tags or specific attributes of specific HTML tags when comparing two screen models from different browsers and the user may configure this rule by specifying which tags or which attributes to ignore in the comparison.

In particular embodiments, the cross-browser compatibility checking service may compare the models of the web application with each other based on the set of comparison rules to determine substantial differences, if any, among the models. In particular embodiments, the service may compare each pair of models based on the set of comparison rules to determine if there are any substantial differences between the two models. In particular embodiments, the differences between two models of the web application may include state-level (also referred to as screen-level) differences or trace-level differences.

In particular embodiments, the equivalence check of the navigation models (constructed during the model-extraction phase) mirrors the hierarchical view of them. In particular embodiments, the comparison is made between each pair of models. Given two models, the cross-browser compatibility checking service first extracts the two state graph models from the respective navigation models and compares them at a trace-level. This provides a set of trace-level differences (i.e., a set of traces that exist in one model and not in the other, and vice versa) between the two models. It also pairs up each screen in the first model with its most likely counter-part in the second model. Next, candidate matching pairs of screens, produced by the first step, are compared in terms of their underlying DOM representations. This unearths detailed state-level differences whose effects may be confined to the individual screen or may play into trace-level differences. In particular embodiments, the equivalence checking process attempts to prune out some of the provably benign differences.

Figure 5A:
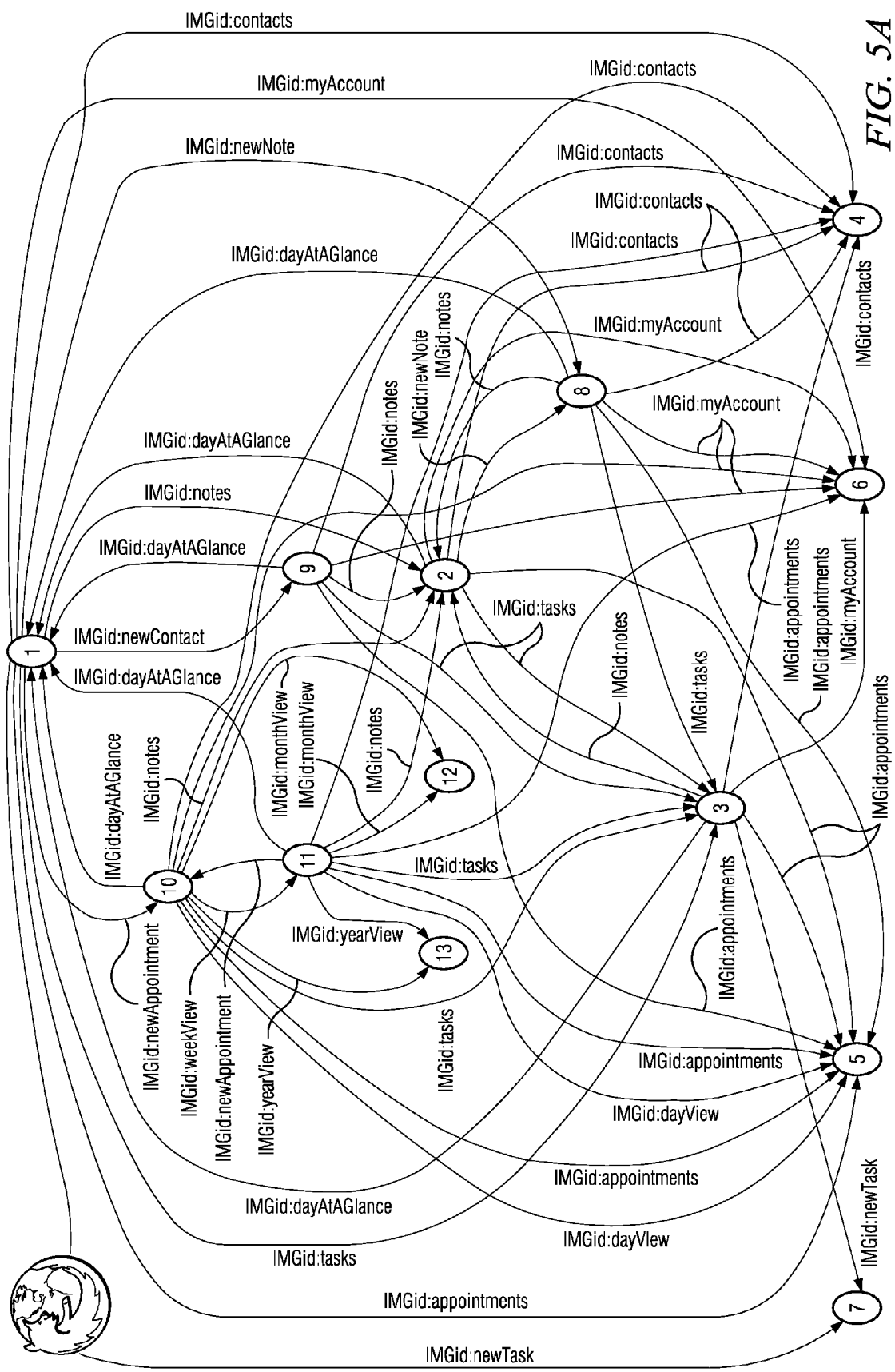
FIGS. 5A and 5B illustrate example trace-level differences between two models, corresponding to two web browsers, of an example web application.
Figure 5B:
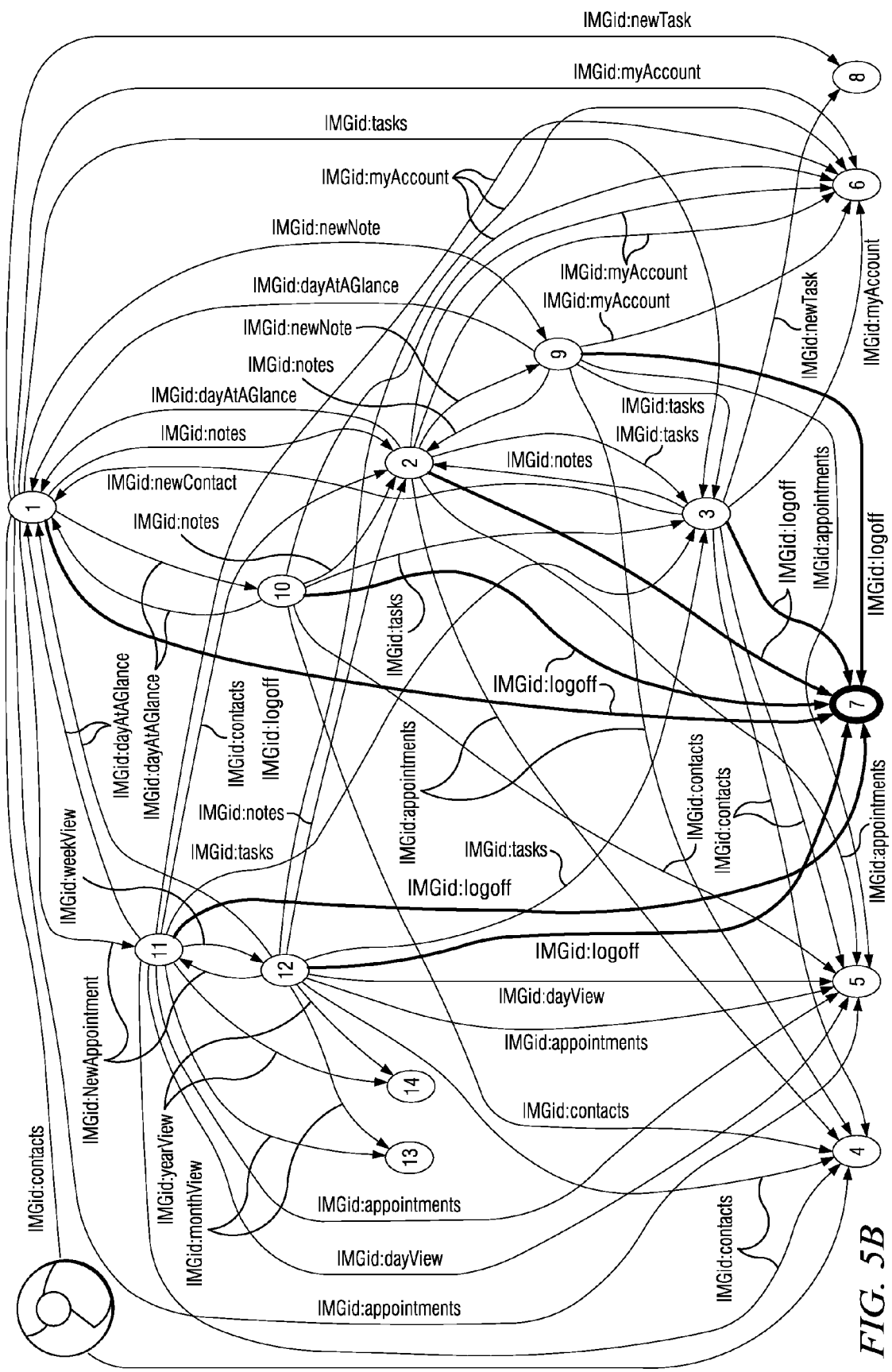
Figure 5C:
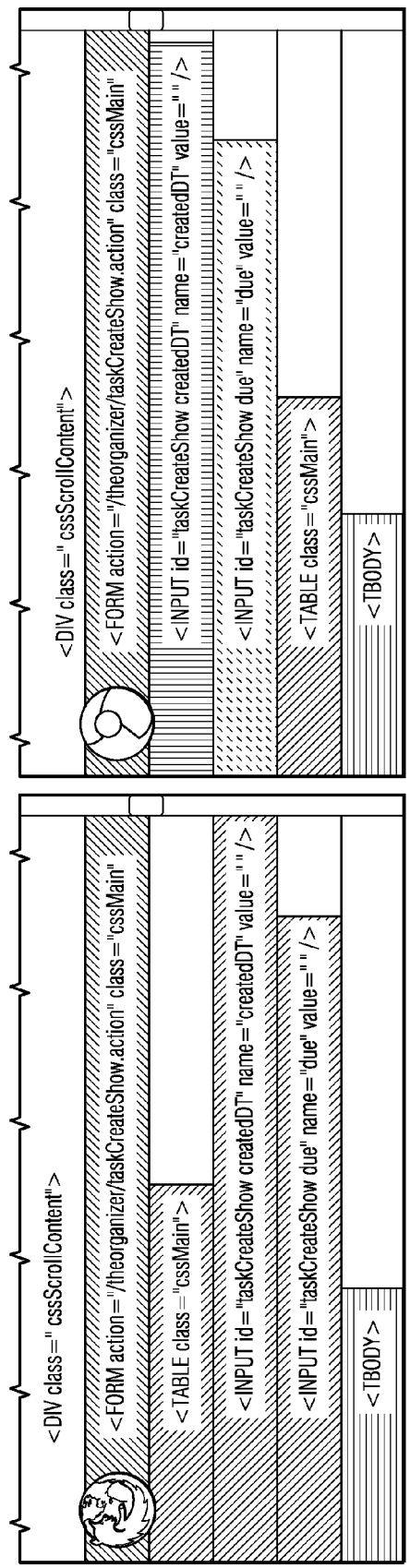
FIG. 5C illustrates example state-level differences between two models, corresponding to two web browsers, of an example web application.

In particular embodiments, during the error-display-and-diagnosis phase, the results of the comparison are displayed to the user so that the user may determine whether the web application is compatible between different types of web browsers. In particular embodiments, for each pair of models that have substantial differences, the cross-browser compatibility checking service may display to the user the state-level differences or the trace-level differences. FIGS. 5A and 5B illustrates example trace-level differences between two models of an example web application. FIG. 5C illustrates example state-level differences between two models of an example web application.

A system for determining differesces in a web application accessed in different types of web browsers is disclosed in U.S. patent application Ser. No. 12/723,568, filed in 12 Mar. 2010, entitled "Determining Differences in an Event-Driven Application Accessed in Different Client-Tier Environments". In particular embodiments, the cross-browser compatibility checking service disclosed herein incorporates various features of the system disclosed in U.S. patent application Ser. No. 12/723,568.

In particular embodiments, although some phases may require results from previous phases, each phase may be executed independently of the other phases and at different times. For example, in order to perform model comparison during the equivalence-checking phase, the models of a web application need to have been constructed during the model-extraction phase. However, a user may choose to have the models of the web application constructed on one day, save the session with the models, and return on a later day to have the models compared. As long as the models of the web application have been constructed before they are compared, the user does not have to choose to execute the model-extraction phase and the equivalence-checking phase in a single sitting of interaction with the cross-browser compatibility checking service. As another example, in order to display the differences between two models of the web application during the error-display-and-diagnosis phase, the state-level and trace-level differences between the two models need to have been determined during the equivalence-checking phase. However, a user may choose to have the models of the web application compared on one day, save the session with the results of the comparison, and return on a later day to have the differences displayed.

In particular embodiments, at each phase, the user may have the following options: (1) make changes to the inputs provided during that phase or repeat the operations of that phase; (2) go back to a previous phase to repeat the operations of the previous phase; or (3) proceed forward to the next phase. For example, the user may specify a first set of comparison rules and have the models of the web application compared based on the first set of comparison rules during the equivalence-checking phase, and view the results of the first comparison during the error-display-and-diagnosis phase. Then, the user may go back to the equivalence-checking phase, specify a second set of comparison rules, and have the models compared based on the second set of comparison rules, and go to the error-display-and-diagnosis phase again to view the results of the second comparison. The user may repeat the process as needed.

In particular embodiments, at each phase, the user may choose to save the current session. In this case, all available user data associated with the current session are saved at server side in connection with the user and with the current session. For example, the URL of the web application, the identifiers of the web browsers specified by the user, the models that have been constructed, if any, the set of comparison rules, if any, and results of the comparisons performed on the models, if any, may be saved with the current session for the user. Subsequently, the user may come back to a saved session and resume and continue with the cross-browser compatibility checking process.

In particular embodiments, the cross-browser compatibility checking service has a user interface through which a user of the service may provide inputs to the service and outputs of the service may be presented to the user. In particular embodiments, the service is a web-based service (e.g., a web application residing and executing on a server) and its user interface may include any number of web pages that may be loaded into a web browser residing and executing on a client. Each user of the service may interact with the web-based service via these web pages.

Figure 2:
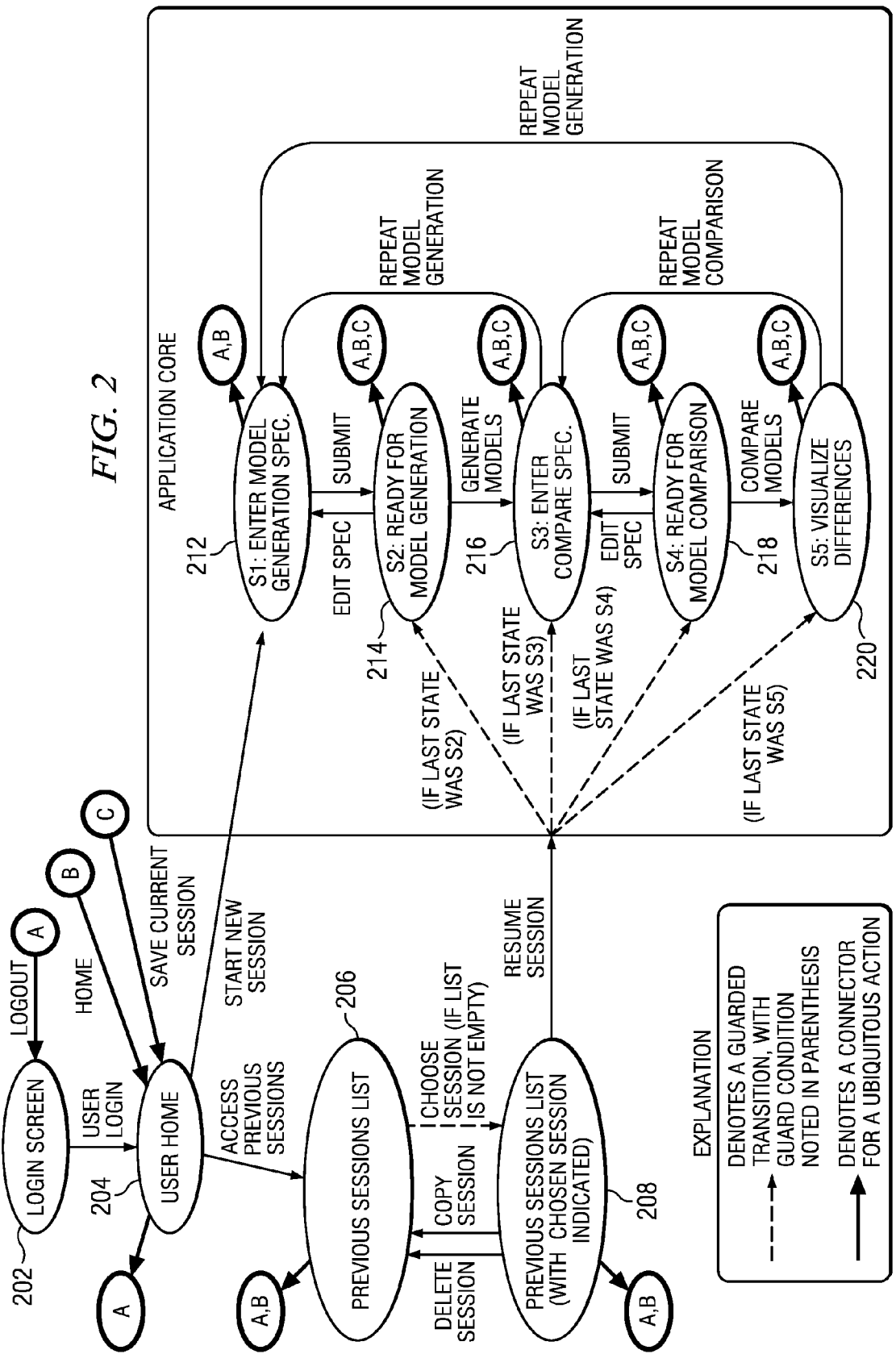
FIG. 2 illustrates the work flow of an example service for checking cross-browser compatibility of web applications.

FIG. 2 illustrates an example work flow of the cross-browser compatibility checking service. The work flow is explained with respect to a single user in order to simplify the description. In practice, the service may be concurrently accessed and used by any number of users, and each user may similarly follow the work flow illustrated in FIG. 2 without interference from other users using the service at the same time or at different times.

In particular embodiments, the cross-browser compatibility checking service may maintain an account for each of its users. All data resulted from a particular user are stored in connection with that user. In particular embodiments, for a specific user, the user may use the service to check cross-browser compatibility for any number of web applications. Each instance of a cross-browser compatibility checking interaction initiated by a particular user, from a particular client at a particular time, has its own work session, and all data resulting from a particular session are stored in connection with that session. Thus, all data are organized on a per-user per-session basis.

In particular embodiments, to begin using the cross-browser compatibility checking service, a user may load the URL of the service in his web browser. By doing so, the user is presented with a login screen, as illustrated in STEP 202. The user may be required to provide a correct combination of login name and password, or some other authorization information, in order to log into his account and use the service. In particular embodiments, if the user is able to provide the correct combination of login name and password to log into his account, the user is directed to his user home, as illustrated in STEP 204. Note that each user has its own user home, and thus, after successfully logging into his account, each user is directed to his own user home. From the user home, the user has many options on how to proceed forward.

First, as explained before, a user may have any number of sessions corresponding to checking cross-browser compatibility of any number of web applications. These sessions may be saved, retrieved, modified, deleted, copied, and so on. All previously saved sessions may be stored for the user on server side. In particular embodiments, from the user home, the user may choose to access a previous sessions list to view all the sessions the user currently has, as illustrated in STEP 206. From this list, the user may select, copy, or delete any one of the previously saved session. Suppose that the user selects one of the previously saved sessions, the selected session in the previous sessions list may be indicated to the user, as illustrated in STEP 208. The selected session may be loaded for the user so that the user may resume work flow of the selected session (e.g., continue the session from where the user has left off previously or make modifications to some parts of the session). For example, suppose the user selects a previously saved session, and when the user has saved this session previously, the models of the web application have been constructed. Then, the user may continue with the work flow for this session and proceed to specific a set of comparison rules and have the models compared with each other based on the set of comparison rules.

Alternatively, the user may delete a previously saved session and remove that session from the user's account. If a session is deleted, all data relating to that session may be deleted. The user may also copy a previously saved session as another new session. If a session is copied, all available data relating to that session may be duplicated for the new session. Thereafter, the two sessions are independent of each other, such that if the user makes any changes to the copied new session, it does not affect the original session, and vice versa. Note that although each session corresponds to a web application, multiple sessions may correspond to the same web application.

Second, the user may choose to start a new session. In this case, the user may go through some or all of the phases illustrated in FIG. 1. Note that STEPS 212, 214, 216, 218, and 220 reflect the three phases illustrated in FIG. 1. During the model-extraction phase, the user may input the URL for a web application to be tested and a list of browsers for compatibility checking, as illustrated in STEP 212. The user may further provide specific information pertaining to exploring the behavior of the web application or resource constraints, if any, as illustrated in STEP 212. Based on the user inputs from STEP 212, models of the web application may be generated with respect to the web browsers, as illustrated in STEP 214. In particular embodiments, the service may automatically and dynamically execute the web application in each web browser to generate a model with respect to that web browser.

After the models are generated, during the equivalence-checking phase, the user may provide a set of comparison rules, as illustrated in STEP 216. In particular embodiments, the user may be presented with a default set of comparison rules, from which the user may select a set of comparison rules for this web application. If the user does not select his own set of comparison rules for this web application, the default set of comparison rules may be used. The cross-browser compatibility checking service compares the models of the web application with each other based on the set of comparison rules to determine if there is any substantial difference between any two of the models, as illustrated in STEP 218. In particular embodiments, the service may compare each pair of models under specified criteria as defined by the comparison rules and generate state-level and travel-level differences for the pair of models.

In particular embodiments, during the error-display-and-diagnosis phase, the results of the comparison performed on the models are presented to the user. In particular embodiments, the state-level and trace-level differences are organized separately and different types of differences are color coded for easier analysis. FIGS. 5A-5C illustrates examples of state-level and trace-level differences between two models.

In particular embodiments, during each session, at any step (e.g., STEPS 212, 214, 216, 218), the user may choose to save the current session and go back to the user home so that the user can log out of the system or start another new session or work on another (e.g., previously saved) session. For example, after having the models of the web application generated at STEP 214, the user may choose to save the current session. The web-based service saves the models for the current session as well as all other currently available user data relating to the current session in connection with this specific session and in connection with this specific user.

In particular embodiments, during each session, at any step (e.g., STEPS 212, 214, 216, 218), the user may choose to go back to a previous step to make modifications and repeat a particular step. For example, after submitting a list of web browsers for checking compatibility of a web application at STEP 212, from any subsequent step, the user can go back to STEP 212 to edit the list of web browsers in order to modify the choices of browsers used for cross-browser compatibility checking. If the user submits a new list of browsers, the models of the web application may be reconstructed with respect to the modified list of browsers. Similarly, after submitting a set of comparison rules for comparing the models at STEP 216, from any subsequent step, the user can go back to STEP 216 to modify the set of comparison rules. If the user submits a new set of comparison rules, the models of the web application may be re-compared based on the modified set of comparison rules.

In particular embodiments, at any step, the user may choose to save all the work thus far completed and log out from his account. If the user logs out, the user may be directed back to the login screen, as illustrated in STEP 202. From the login screen, the user may choose to leave the service for the time being or log back into his account again.

In particular embodiments, a cross-browser compatibility checking service may support any number of users, and each user may have any number of work sessions with each session corresponding to checking the cross-browser compatibility of a specific web application, with specific options, initiated from a specific client at a specific time. Multiple users may use the cross-browser compatibility checking service concurrently or at different times. In particular embodiments, when two users use the cross-browser compatibility checking service at the same time, what one user does with the service does not affect in any way what another user does with service.

Figure 3:
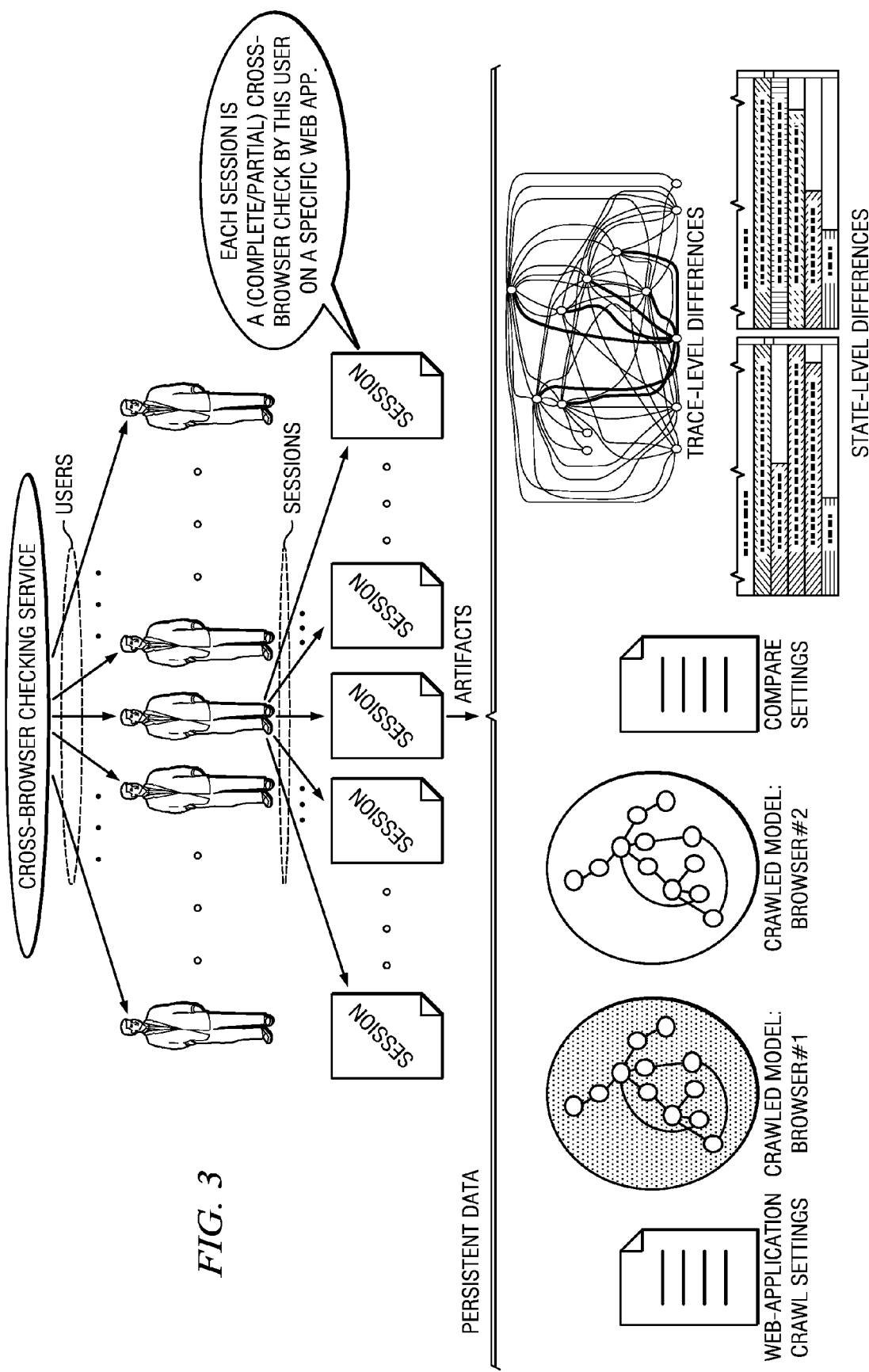
FIG. 3 illustrates user data organization by an example service for checking cross-browser compatibility of web applications

In particular embodiments, the user data (e.g., the URL of the web application, the list of web browsers, the set of comparison rules, models of the web application, or results of the comparisons) are organized on a per-user per-session basis. FIG. 3 illustrates the user data organization by an example cross-browser compatibility checking service. In particular embodiments, each session of each user is for a specific instance of a cross-browser compatibility check. All data relating to performing cross-browser compatibility checking for this instance are organized within the corresponding session. In particular embodiments, for each session, the data may include the URL of the web application, the list of web browsers for cross-browser compatibility checking, behavior exploration specification of the web application, resource constraints of the web application, models of the web application constructed with respect to the different web browsers, the set of comparison rules, travel-level and state-level differences between each pair of models, and so on. In particular embodiments, all user data are stored at server side, such as in a data store or on a server accessible to the cross-browser checking service.

In particular embodiments, two sessions, either of the same user or of two different users, may be for checking cross-browser compatibility of two different web applications or for checking cross-browser compatibility of the same web application. In particular embodiments, when two sessions are for checking cross-browser compatibility of the same web application, other user data, such as the behavior exploration specification or the sets of comparison rules, may differ between the two sessions. In particular embodiments, what a user does with one session does not affect any other session. A session may be saved, retrieved, resumed deleted, or copied as needed, and data within each session may be saved, retrieved, deleted, or modified as needed.

Figure 6:
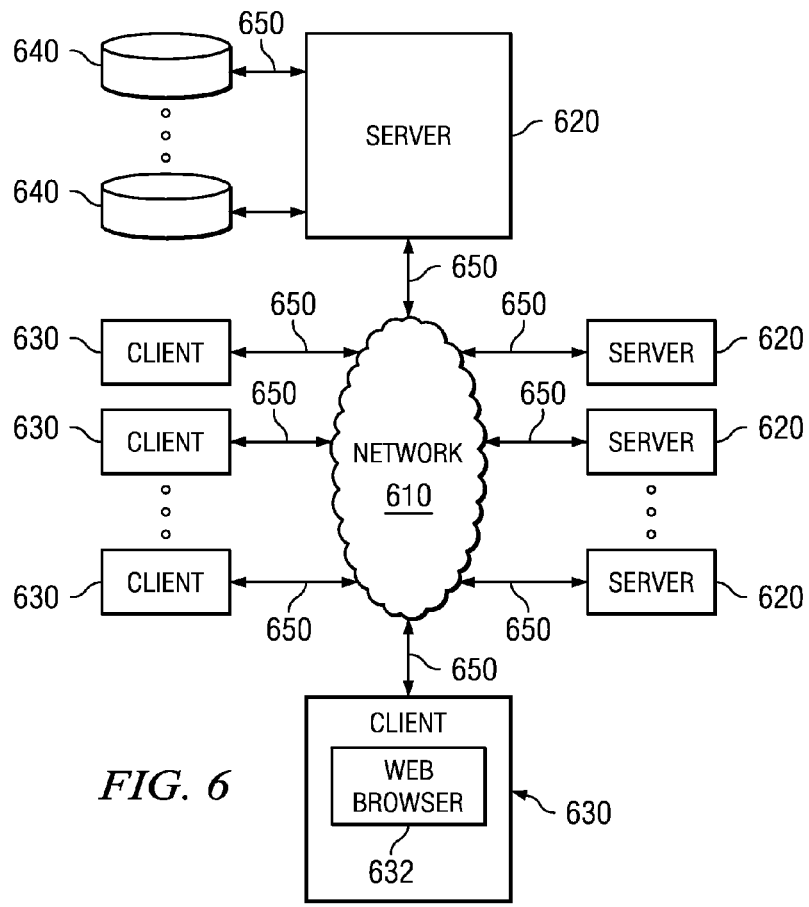
FIG. 6 illustrates an example network environment.

Particular embodiments may be implemented in a network environment. FIG. 6 illustrates an example network environment 600 suitable for providing cross-browser compatibility checking as a web-based service. Network environment 600 includes a network 610 coupling one or more servers 620 and one or more clients 630 to each other. In particular embodiments, network 610 is an intranet, an extranet, a virtual private network (VPN), a local area network (LAN), a wireless LAN (WLAN), a wide area network (WAN), a metropolitan area network (MAN), a portion of the Internet, or another network 610 or a combination of two or more such networks 610. The present disclosure contemplates any suitable network 610.

One or more links 650 couple a server 620 or a client 630 to network 610. In particular embodiments, one or more links 650 each includes one or more wireline, wireless, or optical links 650. In particular embodiments, one or more links 650 each includes an intranet, an extranet, a VPN, a LAN, a WLAN, a WAN, a MAN, a portion of the Internet, or another link 650 or a combination of two or more such links 650. The present disclosure contemplates any suitable links 650 coupling servers 620 and clients 630 to network 610.

In particular embodiments, each server 620 may be a unitary server or may be a distributed server spanning multiple computers or multiple datacenters. Servers 620 may be of various types, such as, for example and without limitation, web server, news server, mail server, message server, advertising server, file server, application server, exchange server, database server, or proxy server. In particular embodiments, each server 620 may include hardware, software, or embedded logic components or a combination of two or more such components for carrying out the appropriate functionalities implemented or supported by server 620. For example, a web server is generally capable of hosting websites containing web pages or particular elements of web pages. More specifically, a web server may host HTML files or other file types, or may dynamically create or constitute files upon a request, and communicate them to clients 630 in response to HTTP or other requests from clients 630. A mail server is generally capable of providing electronic mail services to various clients 630. A database server is generally capable of providing an interface for managing data stored in one or more data stores.

In particular embodiments, one or more data storages 640 may be communicatively linked to one or more severs 620 via one or more links 650. In particular embodiments, data storages 640 may be used to store various types of information. In particular embodiments, the information stored in data storages 640 may be organized according to specific data structures. In particular embodiment, each data storage 640 may be a relational database. Particular embodiments may provide interfaces that enable servers 620 or clients 630 to manage, e.g., retrieve, modify, add, or delete, the information stored in data storage 640.

In particular embodiments, each client 630 may be an electronic device including hardware, software, or embedded logic components or a combination of two or more such components and capable of carrying out the appropriate functionalities implemented or supported by client 630. For example and without limitation, a client 630 may be a desktop computer system, a notebook computer system, a netbook computer system, a handheld electronic device, or a mobile telephone. The present disclosure contemplates any suitable clients 630. A client 630 may enable a network user at client 630 to access network 630. A client 630 may enable its user to communicate with other users at other clients 630.

A client 630 may have a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 630 may enter a Uniform Resource Locator (URL) or other address directing the web browser 632 to a server 620, and the web browser 632 may generate a Hyper Text Transfer Protocol (HTTP) request and communicate the HTTP request to server 620. Server 620 may accept the HTTP request and communicate to client 630 one or more Hyper Text Markup Language (HTML) files responsive to the HTTP request. Client 630 may render a web page based on the HTML files from server 620 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

In particular embodiments, the cross-browser compatibility checking service may reside and execute on a server 620. A user of the service may access the service through a web browser 632 executing on a client 630 associated with the user.

Figure 7:
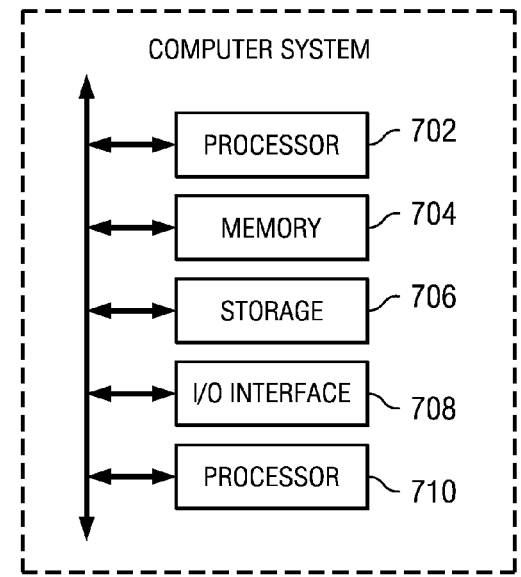
FIG. 7 illustrates an example computer system.

Particular embodiments may be implemented on one or more computer systems. FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 700 may include one or more computer systems 700; be unitary or distributed; span multiple locations; span multiple machines; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. The present disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. The present disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include an HDD, a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 702 (such as, for example, one or more internal registers or caches), one or more portions of memory 704, one or more portions of storage 706, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising: by one or more computing devices,
  presenting a user interface to a first user, the user interface being configured to enable the first user to provide user input that:
    specifies a first web application, a behavior exploration specification pertaining to the first web application, a plurality of web browsers for the first web application, and a set of comparison rules for the first web application;
    requests a plurality of models of the first web application to be constructed with respect to the web browsers based on the behavior exploration specification pertaining to the first web application, including constructing the models with determined transitions between screen models;

requests the models of the first web application to be automatically compared with each other based on the set of comparison rules for the first web application; and requests one or more results of the comparison performed on the models of the first web application to be presented, the results indicating whether there are one or more substantial differences between two or more of the models of the first web application;

receiving one or more user inputs from the first user during one or more sessions; and in response to each user input received from the first user, performing one or more operations for the first user.

2. The method of claim 1, further comprising:
in response to the first user requesting that the models of the first web application be constructed, for each of the web browsers for the first web application, constructing a model of the first web application with respect to the web browser based on the behavior exploration specification pertaining to the first web application;
in response to the first user requesting that the models of the first web application be compared with each other, comparing the models of the first web application with each other based on the set of comparison rules for the first web application; and
in response to the first user requesting that the results of the comparison performed on the models of the first web application be presented, presenting to the first user the results of the comparison performed on the models of the first web application.

3. The method of claim 2,
wherein the user interface is further configured to enable the first user to provide user input that requests information concerning the first web application to be saved; and
the method further comprising, in response to the first user requesting the information concerning the first web application to be saved, saving the first web application, the behavior exploration specification pertaining to the first web application, identifiers of the web browsers for the first web application, and the set of comparison rules for the first web application in connection with the first user.

4. The method of claim 3,
wherein the user interface is further configured to enable the first user to provide user input that:
requests the saved information of the first web application to be retrieved; and
requests the saved information of the first web application to be deleted; and
the method further comprising:
in response to the first user requesting that the saved information of the first web application be retrieved, retrieving the saved first web application, the saved behavior exploration specification pertaining to the first web application, the saved identifiers of the web browsers for the first web application, and the saved set of comparison rules for the first web application for the first user; and
in response to the first user requesting that the saved information of the first web application be deleted, deleting the saved first web application, the saved behavior exploration specification pertaining to the first web application, the saved identifiers of the web browsers for the first web application, and the saved set of comparison rules for the first web application for the first user.

5. The method of claim 1,
wherein the user interface is further configured to enable the first user to provide user input that:
requests the models of the first web application to be saved; and
requests the models of the first web application to be copied; and
the method further comprising:
in response to the first user requesting that the models of the first web application be saved, saving the models of the first web application in connection with the first user; and
in response to the first user requesting that the models of the first web application be copied, copying the models of the first web application for the first user.

6. The method of claim 5,
wherein the user interface is further configured to enable the first user to provide user input that:
requests the saved models of the first web application to be retrieved; and
requests the saved models of the first web application to be deleted; and
the method further comprising:
in response to the first user requesting that the saved models of the first web application be retrieved, retrieving the saved models of the first web application for the first user; and
in response to the first user requesting that the saved models of the first web application be deleted, deleting the saved models of the first web application for the first user.

7. The method of claim 1,
wherein the user interface is further configured to enable the first user to provide user input that requests the results of the comparison performed on the models of the first web application to be saved; and
the method further comprising, in response to the first user requesting that the results of the comparison performed on the models of the first web application be saved, saving the results of the comparison performed on the models of the first web application in connection with the first user.

8. The method of claim 7,
wherein the user interface is further configured to enable the first user to provide user input that:
requests the saved results of the comparison performed on the models of the first web application to be retrieved; and
requests the saved results of the comparison performed on the models of the first web application to be deleted; and
the method further comprising:
in response to the first user requesting that the saved results of the comparison performed on the models of the first web application be retrieved, retrieving the saved results of the comparison performed on the models of the first web application for the first user; and
in response to the first user requesting that the saved results of the comparison performed on the models of the first web application be deleted, deleting the saved results of the comparison performed on the models of the first web application for the first user.

9. The method of claim 1, wherein the user interface is further configured to enable the first user to provide user input that:
modifies the behavior exploration specification pertaining to the first web application;

modifies choices of the web browsers for the first web application; and modifies the set of comparison rules for the first web application.

10. The method of claim 1, further comprising presenting to the first user a default set of comparison rules;

wherein the user interface is further configured to enable the first user to provide user input that selects, from the default set of comparison rules, the set of comparison rules for the first web application.

11. The method of claim 1, wherein the user interface is further configured to enable the first user to provide user input that:

specifies a second web application, a behavior exploration specification pertaining to the second web application, a plurality of web browsers for the second web application; and a set of comparison rules for the second web application;

requests a plurality of models of the second web application to be constructed with respect to the web browsers for the second web application based on the behavior exploration specification pertaining to the second web application;

requests the models of the second web application to be compared with each other based on the set of comparison rules for the second web application; and requests one or more results of the comparison performed on the models of the second web application to be presented, the results indicating whether there are one or more substantial differences between two or more of the models of the second web application.

12. The method of claim 1, wherein the user interface is further configured to enable the first user to provide user input that:

specifies a second web application;

copies the behavior exploration specification pertaining to the first web application as a behavior exploration specification pertaining to the second web application;

copies the web browsers for the first web application as a plurality of web browsers for the second web application; and copies the set of comparison rules for the first web application as a set of comparison rules for the second web application.

13. The method of claim 1, further comprising:

presenting the user interface to a second user, the user interface is further configured to enable the second user to provide user input that:

specifies a second web application, a behavior exploration specification pertaining to the second web application, a plurality of web browsers for the second web application, and a set of comparison rules for the second web application;

requests a plurality of models of the second web application to be constructed with respect to the web browsers for the second web application based on the behavior exploration specification pertaining to the second web application;

requests the models of the second web application to be compared with each other based on the set of comparison rules for the second web application; and requests one or more results of the comparison performed on the models of the second web application to be presented, the results indicating whether there are one or more substantial differences between two or more of the models of the second web application;

receiving one or more user inputs from the second user during one or more sessions; and in response to each user input received from the second user, performing one or more operations for the second user.

14. The method of claim 13, further comprising:

in response to the second user requesting that the models of the second web application be constructed, for each of the web browsers for the second web application, constructing a model of the second web application with respect to the web browser based on the behavior exploration specification pertaining to the second web application;

in response to the second user requesting that the models of the second web application be compared with each other, comparing the models of the second web application with each other based on the set of comparison rules for the second web application; and in response to the second user requesting that the results of the comparison performed on the models of the second web application be presented, presenting to the second user the results of the comparison performed on the models of the second web application.

15. The method of claim 13, wherein the user interface is further configured to enable the second user to provide user input that:

requests information concerning the second web application to be saved;

requests the models of the second web application to be saved;

requests the results of the comparison performed on the models of the second web application to be saved;

requests the saved models of the second web application to be retrieved; and requests the saved results of the comparison performed on the models of the second web application to be retrieved; and the method further comprising:

in response to the second user requesting that the information concerning the second web application be saved, saving the second web application, the behavior exploration specification pertaining to the second web application, the web browsers for the second web application, and the set of comparison rules for the second web application in connection with the second user;

in response to the second user requesting that the models of the second web application be saved, saving the models of the second web application in connection with the second user;

in response to the second user requesting that the results of the comparison performed on the models of the second web application be saved, saving the results of the comparison performed on the models of the second web application in connection with the second user;

in response to the second user requesting that the saved models of the second web application be retrieved, retrieving the saved models of the second web application for the second user; and in response to the second user requesting that the saved results of the comparison performed on the models of the second web application be retrieved, retrieving the saved results of the comparison performed on the models of the second web application for the second user.

16. The method of claim 13, further comprising maintaining an account for the first user and the second user.

17. The method of claim 16,
wherein the user interface is further configured to enable the first user and the second user to provide user input to log into the their respective accounts; and
the method further comprising:
in response to the first user logging into its corresponding account, retrieving information saved in the account in connection with first user; and
in response to the second user logging into its corresponding account, retrieving information saved in the account in connection with second user.

18. A system comprising:
a memory comprising instructions executable by one or more processors; and
the one or more processors coupled to the memory and operable to execute the instructions, the one or more processors being operable when executing the instructions to:
present a user interface to a first user, the user interface being configured to enable the first user to provide user input that:
specifies a first web application, a behavior exploration specification pertaining to the first web application, a plurality of web browsers for the first web application, and a set of comparison rules for the first web application;
requests a plurality of models of the first web application to be constructed with respect to the web browsers based on the behavior exploration specification pertaining to the first web application, including constructing the models with determined transitions between screen models;
requests the models of the first web application to be automatically compared with each other based on the set of comparison rules for the first web application; and
requests one or more results of the comparison performed on the models of the first web application to be presented, the results indicating whether there are one or more substantial differences between two or more of the models of the first web application;
receive one or more user inputs from the first user during one or more sessions; and
in response to each user input received from the first user, perform one or more operations for the first user.

19. The system of claim 18, wherein the one or more processors are further operable when executing the instructions to:
in response to the first user requesting that the models of the first web application be constructed, for each of the web browsers for the first web application, construct a model of the first web application with respect to the web browser based on the behavior exploration specification pertaining to the first web application;
in response to the first user requesting that the models of the first web application be compared with each other, compare the models of the first web application with each other based on the set of comparison rules for the first web application; and
in response to the first user requesting that the results of the comparison performed on the models of the first web application be presented, present to the first user the results of the comparison performed on the models of the first web application.

20. The system of claim 18, wherein:
the user interface is further configured to enable the first user to provide user input that requests information concerning the first web application to be saved; and
the one or more processors are further operable when executing the instructions to, in response to the first user requesting the information concerning the first web application to be saved, save the first web application, the behavior exploration specification pertaining to the first web application, identifiers of the web browsers for the first web application, and the set of comparison rules for the first web application in connection with the first user.

21. The system of claim 20, wherein:
the user interface is further configured to enable the first user to provide user input that:
requests the saved information of the first web application to be retrieved; and
requests the saved information of the first web application to be deleted; and
the one or more processors are further operable when executing the instructions to:
in response to the first user requesting that the saved information of the first web application be retrieved, retrieve the saved first web application, the saved behavior exploration specification pertaining to the first web application, the saved identifiers of the web browsers for the first web application, and the saved set of comparison rules for the first web application for the first user; and
in response to the first user requesting that the saved information of the first web application be deleted, delete the saved first web application, the saved behavior exploration specification pertaining to the first web application, the saved identifiers of the web browsers for the first web application, and the saved set of comparison rules for the first web application for the first user.

22. The system of claim 18, wherein:
the user interface is further configured to enable the first user to provide user input that:
requests the models of the first web application to be saved; and
requests the models of the first web application to be copied; and
the one or more processors are further operable when executing the instructions to:
in response to the first user requesting that the models of the first web application be saved, save the models of the first web application in connection with the first user; and
in response to the first user requesting that the models of the first web application be copied, copy the models of the first web application for the first user.

23. The system of claim 22, wherein:
the user interface is further configured to enable the first user to provide user input that:
requests the saved models of the first web application to be retrieved; and
requests the saved models of the first web application to be deleted; and
the one or more processors are further operable when executing the instructions to:
in response to the first user requesting that the saved models of the first web application be retrieved, retrieve the saved models of the first web application for the first user; and in response to the first user requesting that the saved models of the first web application be deleted, delete the saved models of the first web application for the first user.

24. The system of claim 18, wherein:
the user interface is further configured to enable the first user to provide user input that requests the results of the comparison performed on the models of the first web application to be saved; and
the one or more processors are further operable when executing the instructions to, in response to the first user requesting that the results of the comparison performed on the models of the first web application be saved, save the results of the comparison performed on the models of the first web application in connection with the first user.

25. The system of claim 24, wherein:
the user interface is further configured to enable the first user to provide user input that:
requests the saved results of the comparison performed on the models of the first web application to be retrieved; and
requests the saved results of the comparison performed on the models of the first web application to be deleted; and
the one or more processors are further operable when executing the instructions to:
in response to the first user requesting that the saved results of the comparison performed on the models of the first web application be retrieved, retrieve the saved results of the comparison performed on the models of the first web application for the first user; and
in response to the first user requesting that the saved results of the comparison performed on the models of the first web application be deleted, delete the saved results of the comparison performed on the models of the first web application for the first user.

26. The system of claim 18, wherein the user interface is further configured to enable the first user to provide user input that:
modifies the behavior exploration specification pertaining to the first web application;
modifies choices of the web browsers for the first web application; and
modifies the set of comparison rules for the first web application.

27. The system of claim 18, wherein:
the one or more processors are further operable when executing the instructions to present to the first user a default set of comparison rules; and
the user interface is further configured to enable the first user to provide user input that selects, from the default set of comparison rules, the set of comparison rules for the first web application.

28. The system of claim 18, wherein the user interface is further configured to enable the first user to provide user input that:
specifies a second web application, a behavior exploration specification pertaining to the second web application, a plurality of web browsers for the second web application; and a set of comparison rules for the second web application;
requests a plurality of models of the second web application to be constructed with respect to the web browsers for the second web application based on the behavior exploration specification pertaining to the second web application;
requests the models of the second web application to be compared with each other based on the set of comparison rules for the second web application; and
requests one or more results of the comparison performed on the models of the second web application to be presented, the results indicating whether there are one or more substantial differences between two or more of the models of the second web application.

29. The system of claim 18, wherein the user interface is further configured to enable the first user to provide user input that:
specifies a second web application;
copies the behavior exploration specification pertaining to the first web application as a behavior exploration specification pertaining to the second web application;
copies the web browsers for the first web application as a plurality of web browsers for the second web application; and
copies the set of comparison rules for the first web application as a set of comparison rules for the second web application.

30. The system of claim 18, wherein the one or more processors are further operable when executing the instructions to:
present the user interface to a second user, the user interface is further configured to enable the second user to provide user input that:
specifies a second web application, a behavior exploration specification pertaining to the second web application, a plurality of web browsers for the second web application, and a set of comparison rules for the second web application;
requests a plurality of models of the second web application to be constructed with respect to the web browsers for the second web application based on the behavior exploration specification pertaining to the second web application;
requests the models of the second web application to be compared with each other based on the set of comparison rules for the second web application; and
requests one or more results of the comparison performed on the models of the second web application to be presented, the results indicating whether there are one or more substantial differences between two or more of the models of the second web application;
receive one or more user inputs from the second user during one or more sessions; and
in response to each user input received from the second user, perform one or more operations for the second user.

31. The system of claim 30, wherein the one or more processors are further operable when executing the instructions to:
in response to the second user requesting that the models of the second web application be constructed, for each of the web browsers for the second web application, construct a model of the second web application with respect to the web browser based on the behavior exploration specification pertaining to the second web application;
in response to the second user requesting that the models of the second web application be compared with each other, compare the models of the second web application with each other based on the set of comparison rules for the second web application; and in response to the second user requesting that the results of the comparison performed on the models of the second web application be presented, present to the second user the results of the comparison performed on the models of the second web application.

32. The system of claim 30, wherein:
the user interface is further configured to enable the second user to provide user input that:
  requests information concerning the second web application to be saved;
  requests the models of the second web application to be saved;
  requests the results of the comparison performed on the models of the second web application to be saved;
  requests the saved models of the second web application to be retrieved; and
  requests the saved results of the comparison performed on the models of the second web application to be retrieved; and
the one or more processors are further operable when executing the instructions to:
  in response to the second user requesting that the information concerning the second web application be saved, save the second web application, the behavior exploration specification pertaining to the second web application, the web browsers for the second web application, and the set of comparison rules for the second web application in connection with the second user;
  in response to the second user requesting that the models of the second web application be saved, save the models of the second web application in connection with the second user;
  in response to the second user requesting that the results of the comparison performed on the models of the second web application be saved, save the results of the comparison performed on the models of the second web application in connection with the second user;
  in response to the second user requesting that the saved models of the second web application be retrieved, retrieve the saved models of the second web application for the second user; and
  in response to the second user requesting that the saved results of the comparison performed on the models of the second web application be retrieved, retrieve the saved results of the comparison performed on the models of the second web application for the second user.

33. The system of claim 30, wherein the one or more processors are further operable when executing the instructions to maintain an account for the first user and the second user.

34. The system of claim 33, wherein:
the user interface is further configured to enable the first user and the second user to provide user input to log into the their respective accounts; and
the one or more processors are further operable when executing the instructions to:
  in response to the first user logging into its corresponding account, retrieve information saved in the account in connection with first user; and
  in response to the second user logging into its corresponding account, retrieve information saved in the account in connection with second user.

35. One or more computer-readable non-transitory storage media embodying software operable when executed to:
  present a user interface to a first user, the user interface being configured to enable the first user to provide user input that:
    specifies a first web application, a behavior exploration specification pertaining to the first web application, a plurality of web browsers for the first web application, and a set of comparison rules for the first web application;
    requests a plurality of models of the first web application to be constructed with respect to the web browsers based on the behavior exploration specification pertaining to the first web application, including constructing the models with determined transitions between screen models;
    requests the models of the first web application to be automatically compared with each other based on the set of comparison rules for the first web application; and
    requests one or more results of the comparison performed on the models of the first web application to be presented, the results indicating whether there are one or more substantial differences between two or more of the models of the first web application;
  receive one or more user inputs from the first user during one or more sessions; and
  in response to each user input received from the first user, perform one or more operations for the first user.

36. The media of claim 35, wherein the software is further operable when executed by the one or more computer systems to:
  in response to the first user requesting that the models of the first web application be constructed, for each of the web browsers for the first web application, construct a model of the first web application with respect to the web browser based on the behavior exploration specification pertaining to the first web application;
  in response to the first user requesting that the models of the first web application be compared with each other, compare the models of the first web application with each other based on the set of comparison rules for the first web application; and
  in response to the first user requesting that the results of the comparison performed on the models of the first web application be presented, present to the first user the results of the comparison performed on the models of the first web application.

37. The media of claim 35, wherein:
the user interface is further configured to enable the first user to provide user input that requests information concerning the first web application to be saved; and
the software is further operable when executed by the one or more computer systems to, in response to the first user requesting the information concerning the first web application to be saved, save the first web application, the behavior exploration specification pertaining to the first web application, identifiers of the web browsers for the first web application, and the set of comparison rules for the first web application in connection with the first user.

38. The media of claim 37, wherein:
the user interface is further configured to enable the first user to provide user input that:
  requests the saved information of the first web application to be retrieved; and
  requests the saved information of the first web application to be deleted; and the software is further operable when executed by the one or more computer systems to:
in response to the first user requesting that the saved information of the first web application be retrieved, retrieve the saved first web application, the saved behavior exploration specification pertaining to the first web application, the saved identifiers of the web browsers for the first web application, and the saved set of comparison rules for the first web application for the first user; and
in response to the first user requesting that the saved information of the first web application be deleted, delete the saved first web application, the saved behavior exploration specification pertaining to the first web application, the saved identifiers of the web browsers for the first web application, and the saved set of comparison rules for the first web application for the first user.

39. The media of claim 35, wherein:
the user interface is further configured to enable the first user to provide user input that:
requests the models of the first web application to be saved; and
requests the models of the first web application to be copied; and
the software is further operable when executed by the one or more computer systems to:
in response to the first user requesting that the models of the first web application be saved, save the models of the first web application in connection with the first user; and
in response to the first user requesting that the models of the first web application be copied, copy the models of the first web application for the first user.

40. The media of claim 39, wherein:
the user interface is further configured to enable the first user to provide user input that:
requests the saved models of the first web application to be retrieved; and
requests the saved models of the first web application to be deleted; and
the software is further operable when executed by the one or more computer systems to:
in response to the first user requesting that the saved models of the first web application be retrieved, retrieve the saved models of the first web application for the first user; and
in response to the first user requesting that the saved models of the first web application be deleted, delete the saved models of the first web application for the first user.

41. The media of claim 35, wherein:
the user interface is further configured to enable the first user to provide user input that requests the results of the comparison performed on the models of the first web application to be saved; and
the software is further operable when executed by the one or more computer systems to, in response to the first user requesting that the results of the comparison performed on the models of the first web application be saved, save the results of the comparison performed on the models of the first web application in connection with the first user.

42. The media of claim 41, wherein:
the user interface is further configured to enable the first user to provide user input that:
requests the saved results of the comparison performed on the models of the first web application to be retrieved; and
requests the saved results of the comparison performed on the models of the first web application to be deleted; and
the software is further operable when executed by the one or more computer systems to:
in response to the first user requesting that the saved results of the comparison performed on the models of the first web application be retrieved, retrieve the saved results of the comparison performed on the models of the first web application for the first user; and
in response to the first user requesting that the saved results of the comparison performed on the models of the first web application be deleted, delete the saved results of the comparison performed on the models of the first web application for the first user.

43. The media of claim 35, wherein the user interface is further configured to enable the first user to provide user input that:
modifies the behavior exploration specification pertaining to the first web application;
modifies choices of the web browsers for the first web application; and
modifies the set of comparison rules for the first web application.

44. The media of claim 35, wherein:
the software is further operable when executed by the one or more computer systems to present to the first user a default set of comparison rules; and
the user interface is further configured to enable the first user to provide user input that selects, from the default set of comparison rules, the set of comparison rules for the first web application.

45. The media of claim 35, wherein the user interface is further configured to enable the first user to provide user input that:
specifies a second web application, a behavior exploration specification pertaining to the second web application, a plurality of web browsers for the second web application; and a set of comparison rules for the second web application;
requests a plurality of models of the second web application to be constructed with respect to the web browsers for the second web application based on the behavior exploration specification pertaining to the second web application;
requests the models of the second web application to be compared with each other based on the set of comparison rules for the second web application; and
requests one or more results of the comparison performed on the models of the second web application to be presented, the results indicating whether there are one or more substantial differences between two or more of the models of the second web application.

46. The media of claim 35, wherein the user interface is further configured to enable the first user to provide user input that:
specifies a second web application;
copies the behavior exploration specification pertaining to the first web application as a behavior exploration specification pertaining to the second web application;
copies the web browsers for the first web application as a plurality of web browsers for the second web application; and copies the set of comparison rules for the first application as a set of comparison rules for the second web application.

47. The media of claim 35, wherein the software is further operable when executed by the one or more computer systems to:
present the user interface to a second user, the user interface is further configured to enable the second user to provide user input that:
specifies a second web application, a behavior exploration specification pertaining to the second web application, a plurality of web browsers for the second web application, and a set of comparison rules for the second web application;
requests a plurality of models of the second web application to be constructed with respect to the web browsers for the second web application based on the behavior exploration specification pertaining to the second web application;
requests the models of the second web application to be compared with each other based on the set of comparison rules for the second web application; and
requests one or more results of the comparison performed on the models of the second web application to be presented, the results indicating whether there are one or more substantial differences between two or more of the models of the second web application;
receive one or more user inputs from the second user during one or more sessions; and
in response to each user input received from the second user, perform one or more operations for the second user.

48. The media of claim 47, wherein the software is further operable when executed by the one or more computer systems to:
in response to the second user requesting that the models of the second web application be constructed, for each of the web browsers for the second web application, construct a model of the second web application with respect to the web browser based on the behavior exploration specification pertaining to the second web application;
in response to the second user requesting that the models of the second web application be compared with each other, compare the models of the second web application with each other based on the set of comparison rules for the second web application; and
in response to the second user requesting that the results of the comparison performed on the models of the second web application be presented, present to the second user the results of the comparison performed on the models of the second web application.

49. The media of claim 47, wherein:
the user interface is further configured to enable the second user to provide user input that:
requests information concerning the second web application to be saved;
requests the models of the second web application to be saved;
requests the results of the comparison performed on the models of the second web application to be saved;
requests the saved models of the second web application to be retrieved; and
requests the saved results of the comparison performed on the models of the second web application to be retrieved; and
the software is further operable when executed by the one or more computer systems to:
in response to the second user requesting that the information concerning the second web application be saved, save the second web application, the behavior exploration specification pertaining to the second web application, the web browsers for the second web application, and the set of comparison rules for the second web application in connection with the second user;
in response to the second user requesting that the models of the second web application be saved, save the models of the second web application in connection with the second user;
in response to the second user requesting that the results of the comparison performed on the models of the second web application be saved, save the results of the comparison performed on the models of the second web application in connection with the second user;
in response to the second user requesting that the saved models of the second web application be retrieved, retrieve the saved models of the second web application for the second user; and
in response to the second user requesting that the saved results of the comparison performed on the models of the second web application be retrieved, retrieve the saved results of the comparison performed on the models of the second web application for the second user.

50. The media of claim 47, wherein the software is further operable when executed by the one or more computer systems to maintain an account for the first user and the second user.

51. The media of claim 50, wherein:
the user interface is further configured to enable the first user and the second user to provide user input to log into the their respective accounts; and
the software is further operable when executed by the one or more computer systems to:
in response to the first user logging into its corresponding account, retrieve information saved in the account in connection with first user; and
in response to the second user logging into its corresponding account, retrieve information saved in the account in connection with second user.

52. A system comprising:
means for presenting a user interface to a first user, the user interface being configured to enable the first user to provide user input that:
specifies a first web application, a behavior exploration specification pertaining to the first web application, a plurality of web browsers for the first web application, and a set of comparison rules for the first web application;
requests a plurality of models of the first web application to be constructed with respect to the web browsers based on the behavior exploration specification pertaining to the first web application, including constructing the models with determined transitions between screen models;
requests the models of the first web application to be automatically compared with each other based on the set of comparison rules for the first web application; and
requests one or more results of the comparison performed on the models of the first web application to be presented, the results indicating whether there are one or more substantial differences between two or more of the models of the first web application;

means for receiving one or more user inputs from the first user during one or more sessions; and in response to each user input received from the first user, means for performing one or more operations for the first user.

\* \* \* \* \*